(12) United States Patent
Ban

(10) Patent No.: US 10,564,838 B2
(45) Date of Patent: *Feb. 18, 2020

(54) METHOD AND APPARATUS FOR PROVIDING POI INFORMATION IN PORTABLE TERMINAL

(71) Applicant: Samsung Electronics Co., Ltd., Suwon-si (KR)

(72) Inventor: Ji-Hye Ban, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 110 days.

This patent is subject to a terminal disclaimer.

(21) Appl. No.: 15/491,832

(22) Filed: Apr. 19, 2017

(65) Prior Publication Data
US 2017/0220247 A1  Aug. 3, 2017

Related U.S. Application Data

(63) Continuation of application No. 12/807,287, filed on Sep. 1, 2010, now Pat. No. 9,652,144.

(30) Foreign Application Priority Data

Sep. 7, 2009  (KR) ........................ 10-2009-0083801

(51) Int. Cl.
*G06F 3/00* (2006.01)
*G06F 3/0488* (2013.01)
(Continued)

(52) U.S. Cl.
CPC ........ *G06F 3/04883* (2013.01); *G06F 3/0482* (2013.01); *G06F 3/0488* (2013.01);
(Continued)

(58) Field of Classification Search
CPC .. G06F 3/0488; G06F 3/04817; G06F 3/0482; G06F 3/0484; G06F 3/04842; G06F 3/04883

See application file for complete search history.

(56) References Cited

U.S. PATENT DOCUMENTS 5,428,805 A * 6/1995 Morgan ............. G06F 3/04883
                                                    345/173
5,867,150 A * 2/1999 Bricklin ............. G06F 16/5854
                                                    345/173
(Continued)

FOREIGN PATENT DOCUMENTS

KR    10-100837166 B1    6/2008
KR    10-2009-0071076 A    7/2009

OTHER PUBLICATIONS

Notice of Preliminary Rejection dated Aug. 7, 2015 in connection with Korean Patent Application No. 10-2009-0083801; 9 pages.

(Continued)

*Primary Examiner* — Kieu D Vu
*Assistant Examiner* — Andrew Chung

(57) ABSTRACT

A method and apparatus for providing Point Of Interest (POI) information in a portable terminal are provided. The method includes displaying an image mapped with at least one POI on a screen, sensing if the screen is touched in a closed curve shape, and displaying information on the POI mapped to an area within a closed curve of the displayed image.

20 Claims, 10 Drawing Sheets

(51) Int. Cl.
  *G06F 3/0481* (2013.01)
  *G06F 3/0482* (2013.01)
  *G06F 3/0484* (2013.01)
  *H04N 5/232* (2006.01)
  *H04W 4/12* (2009.01)

(52) U.S. Cl.
  CPC ...... *G06F 3/04817* (2013.01); *G06F 3/04842* (2013.01); *H04N 5/23293* (2013.01); *H04W 4/12* (2013.01); *G06F 3/0484* (2013.01)

(56) References Cited

U.S. PATENT DOCUMENTS

| | | | |
|---|---|---|---|
| 6,219,028 B1* | 4/2001 | Simonson | G06F 3/04812 345/157 |
| 6,760,049 B1* | 7/2004 | Todd | G06F 3/04842 715/813 |
| 7,831,917 B1 | 11/2010 | Karam | |
| 8,239,129 B2 | 8/2012 | Shen et al. | |
| 8,339,399 B2* | 12/2012 | Snow | G06T 17/05 345/440 |
| 8,756,501 B1 | 6/2014 | Karam | |
| 2002/0130906 A1 | 9/2002 | Miyaki | |
| 2002/0178183 A1* | 11/2002 | Meding | G06F 17/27 715/262 |
| 2003/0214536 A1* | 11/2003 | Jarrett | G06F 3/0481 715/831 |
| 2004/0243306 A1* | 12/2004 | Han | G01C 21/3682 701/438 |
| 2004/0266396 A1* | 12/2004 | Henry | G06F 3/04817 455/412.1 |
| 2006/0161871 A1* | 7/2006 | Hotelling | G06F 3/0485 715/863 |
| 2007/0109281 A1* | 5/2007 | Simmons | G06F 3/03545 345/179 |
| 2007/0124700 A1* | 5/2007 | Koivisto | G06F 9/451 715/837 |
| 2007/0162942 A1 | 7/2007 | Hamynen et al. | |
| 2007/0186154 A1 | 8/2007 | Anthony et al. | |
| 2007/0271035 A1* | 11/2007 | Stoschek | G01C 21/3682 701/533 |
| 2008/0005698 A1* | 1/2008 | Koskinen | G06F 3/0481 715/835 |
| 2008/0182598 A1 | 7/2008 | Bowman | |
| 2008/0215985 A1* | 9/2008 | Batchelder | G06F 17/211 715/731 |
| 2008/0268876 A1 | 10/2008 | Gelfand et al. | |
| 2008/0282138 A1 | 11/2008 | Barthelmess et al. | |
| 2009/0102859 A1 | 4/2009 | Athsani et al. | |
| 2009/0171576 A1 | 7/2009 | Kim et al. | |
| 2009/0198767 A1 | 8/2009 | Jakobson et al. | |
| 2009/0241061 A1 | 9/2009 | Asai et al. | |
| 2009/0267915 A1 | 10/2009 | Silverbrook et al. | |
| 2009/0307623 A1* | 12/2009 | Agarawala | G06F 3/04815 715/765 |
| 2009/0327071 A1 | 12/2009 | Kreft | |
| 2010/0125407 A1 | 5/2010 | Cho et al. | |
| 2010/0138762 A1* | 6/2010 | Reghetti | G06T 19/20 715/765 |
| 2010/0169758 A1* | 7/2010 | Thomsen | G06F 17/246 715/212 |
| 2010/0174985 A1* | 7/2010 | Levy | G06F 17/211 715/244 |
| 2010/0268451 A1* | 10/2010 | Choi | G01C 21/3602 701/533 |
| 2010/0318573 A1* | 12/2010 | Yoshikoshi | G06F 3/04883 707/802 |
| 2010/0333124 A1* | 12/2010 | Folgner | H04H 60/33 725/13 |
| 2011/0018818 A1 | 1/2011 | Iwano | |
| 2011/0022292 A1* | 1/2011 | Shen | G10L 15/1815 701/532 |
| 2011/0022393 A1* | 1/2011 | Waller | G01C 21/3608 704/270 |
| 2011/0109618 A1* | 5/2011 | Nowak | G01C 21/3647 345/419 |

OTHER PUBLICATIONS

Rathbone, Windows 7 for Dummies, For Dummies, ISBN 978-0-470-49743-2, Sep. 8, 2009, p. 83.

* cited by examiner

METHOD AND APPARATUS FOR PROVIDING POI INFORMATION IN PORTABLE TERMINAL

CROSS-REFERENCE TO RELATED APPLICATION(S) AND CLAIM OF PRIORITY

The present application is a continuation of U.S. patent application Ser. No. 12/807,287 filed Sep. 1, 2010, and is related to and claims the benefit under 35 U.S.C. § 119(a) of a Korean patent application filed in the Korean Intellectual Property Office on Sep. 7, 2009 and assigned Serial No. 10-2009-00083801, the entire disclosure of which is hereby incorporated by reference.

TECHNICAL FIELD OF THE INVENTION

The present invention relates to a method and apparatus for providing Point Of Interest (POI) information in a portable terminal. More particularly, the present invention relates to a method and apparatus for providing POI information in a portable terminal that supports Mixed Reality (MR) technology.

BACKGROUND OF THE INVENTION

In recent years, a technology for making viewers simultaneously enjoy the virtual world and the real world using an overlay technique of laying a graphic or text image that shows a description of the real thing over a real image input through a camera and an MR technique in a portable terminal has been developed.

For example, a technique for, after displaying an icon for showing information on a specific topographical feature, displaying the information on a preview screen if a user selects the icon in a portable terminal is available. Also, a technique for displaying POI information on a screen when there is a topographical feature with POI within a predetermined focus area in a preview screen is available.

However, the above scheme has a disadvantage such that, when there are too many icons in a screen, it is difficult to individually select the icons that the user intends to view. When the topographical feature with POI exists in the preview screen but not within the predetermined focus area, this causes an inconvenience in that the user has to manually move a camera such that the topographical feature is included within the predetermined focus area.

SUMMARY OF THE INVENTION

An aspect of the present invention is to substantially solve at least the above problems and/or disadvantages and to provide at least the advantages below. Accordingly, one aspect of the present invention is to provide a method and apparatus for providing Point Of Interest (POI) information in a portable terminal.

Another aspect of the present invention is to provide a method and apparatus for providing POI information in a portable terminal supporting a Mixed Reality (MR) technology.

Another aspect of the present invention is to provide a method and apparatus for displaying information on a POI included within a closed curve drawn according to a user's touch in a portable terminal supporting an MR technology.

Yet another aspect of the present invention is to provide a method and apparatus for transmitting information on a selected POI to other Mobile Station (MS) through a message in a portable terminal supporting an MR technology.

The above aspects are achieved by providing a method and apparatus for providing POI information in a portable terminal.

According to one aspect of the present invention, a method for providing POI information in a portable terminal is provided. The method includes displaying an image mapped to at least one POI on a screen, sensing whether the screen is touched in a closed curve shape, and displaying information on a POI mapped to an area within a closed curve of the displayed image.

According to another aspect of the present invention, a method for providing POI information in a portable terminal is provided. The method includes receiving a message including POI information. When the message including the POI information is received, a link function menu is provided using the POI information. The link function menu includes at least one of 'Auto Calling', 'Web Link', and 'Navigation'.

According to another further aspect of the present invention, an apparatus for providing POI information in a portable terminal is provided. The apparatus includes a display unit and a controller. The display unit displays an image that is mapped to at least one POI on a screen. The controller senses whether the screen is touched in a closed curve shape and controls the display unit to display information on a POI mapped to an area within a closed curve of the displayed image.

According to a yet another aspect of the present invention, an apparatus for providing POI information in a portable terminal is provided. The apparatus includes a controller for, when a message including POI information is received from other MS, providing a link function menu using the POI information. The link function menu includes at least one of 'Auto Calling', 'Web Link', and 'Navigation'.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminals.

The following description is made for a technique for displaying information on a Point Of Interest (POI) included within a closed curve drawn according to a user's touch, and transmitting information on a selected POI to a Mobile Station (MS) through a message in a portable terminal supporting a Mixed Reality (MR) technology according to the present invention.

Figure 1:
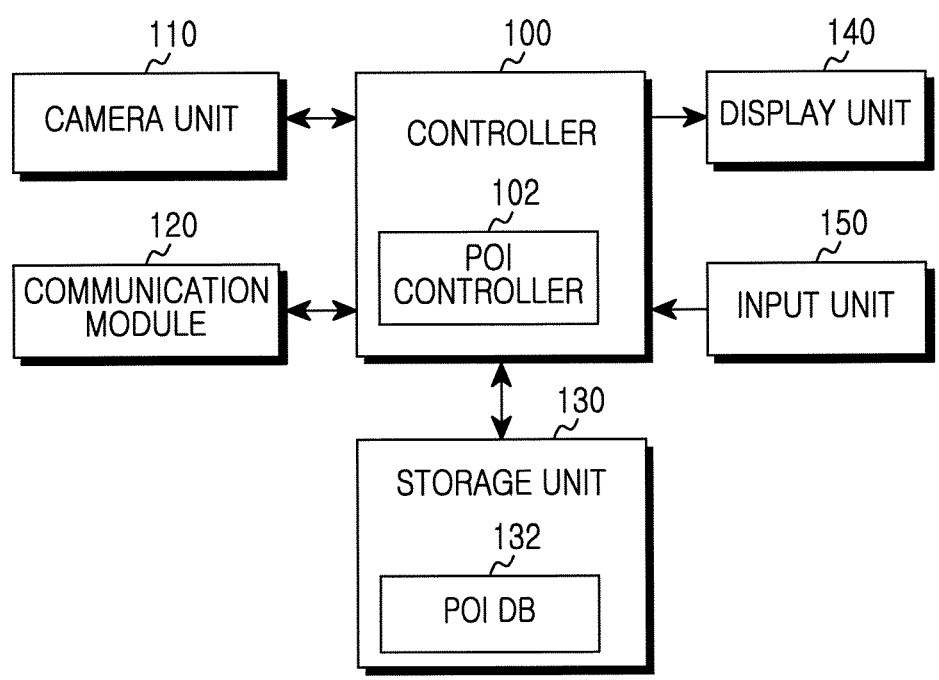
FIG. 1 illustrates a portable terminal according to an embodiment of the present invention.

FIG. 1 illustrates a portable terminal according to an embodiment of the present invention.

Referring to FIG. 1, the portable terminal includes a controller 100, a camera unit 110, a communication module 120, a storage unit 130, a display unit 140, and an input unit 150. The controller 100 includes a POI controller 102, and the storage unit 130 includes a POI Database (DB) 132.

The controller 100 controls and processes a general operation of the portable terminal. Particularly, the controller 100 includes the POI controller 102 according to the present invention. Upon execution of an application providing POI information using MR, the controller 100 controls and processes a function for sensing a touch of a closed curve shape, searching information on a POI existing within a closed curve, and displaying the searched information on a screen of the display unit 140. Also, the controller 100 controls and processes a function for including the POI information displayed on the screen in a message and transmitting the message including the POI information to other MS, by means of the POI controller 102.

Upon execution of the application providing the POI information, the POI controller 102 acquires POI information corresponding to an image input through the camera unit 110. At this time, the POI information may be either acquired from the POI DB 132 or may be acquired from an external device or a network. Here, the POI controller 102 may display the existence of the POI information corresponding to the image on the screen by means of an icon. The icon is displayed in a position of an area of the image corresponding to a corresponding POI.

When the screen is touched by a user during the execution of the application that provides the POI information, the POI controller 102 receives a coordinate of the touch from the input unit 150, and determines if the touch is performed in a closed curve shape. When the touch is performed in the closed curve shape, the POI controller 102 determines if there exists a POI corresponding to an area within a closed curve of the displayed image. Here, the POI controller 102 may determine if the icon is displayed in the area within the closed curve of the displayed image, or may determine if the POI corresponding to the area exists within the closed curve of the displayed image through a search of the POI DB 132. If the POI corresponding to the area exists within the closed curve of the displayed image, the POI controller 102 searches information on the POI in the POI DB 132 and displays the searched POI information on the screen of the display unit 140.

Also, in a state in which the POI information is displayed on the screen, when a Short Message Service (SMS) or Multimedia Message Service (MMS) message send menu is selected, the POI controller 102 converts the POI information displayed on the screen into a text and displays an SMS or MMS message creation screen including the text on the display unit 140. When the MMS message send menu is selected, the POI controller 102 acquires a thumbnail image of an image displayed on the screen and includes the thumbnail image in the MMS message creation screen. Also, in a state in which the POI information is displayed on the screen, when an image capture event takes place by a user, the POI controller 102 captures the screen of the portable terminal to acquire an image, and converts the POI information displayed on the screen into a text. If the MMS message send menu is selected, the POI controller 102 displays an MMS message creation screen including the captured image and the converted text. If a user sends a message, the POI controller 102 controls and processes a function for sending a created SMS or MMS message.

The camera unit 110 includes a camera sensor (not shown) and a signal processor (not shown). The camera unit 110 converts an optic signal sensed through the camera sensor during image photographing into an electrical signal, converts an analog image signal photographed from the camera sensor into digital data through the signal processor, processes the image signal into a frame unit, and provides the image signal to the controller 100.

The communication module 120 performs a function for transmitting/receiving and processing a radio signal of data input/output through an antenna (not shown). Particularly, the communication module 120 processes a signal for transmitting/receiving a message including POI information according to the present invention.

The storage unit 130 stores various kinds of programs and data for general operation of the portable terminal, and includes the POI DB 132 according to the present invention. The POI DB 132 stores POI name and detail information on specific topographical features. The POI DB 132 may be also previously stored, and may be updated by a network or an external device.

The display unit 140 displays state information of the portable terminal, numerals, characters, a large amount of moving pictures and still pictures, and such. Particularly, the display unit 140 displays POI information or a POI icon in a predetermined area of a screen and displays a message creation screen including the text-converted POI information or a POI related image, under control of the controller 100.

The input unit 150 includes a plurality of function keys and numeral and character keys, and provides input data corresponding to a key pressed by a user or a user's touch to the controller 100.

Figure 2:
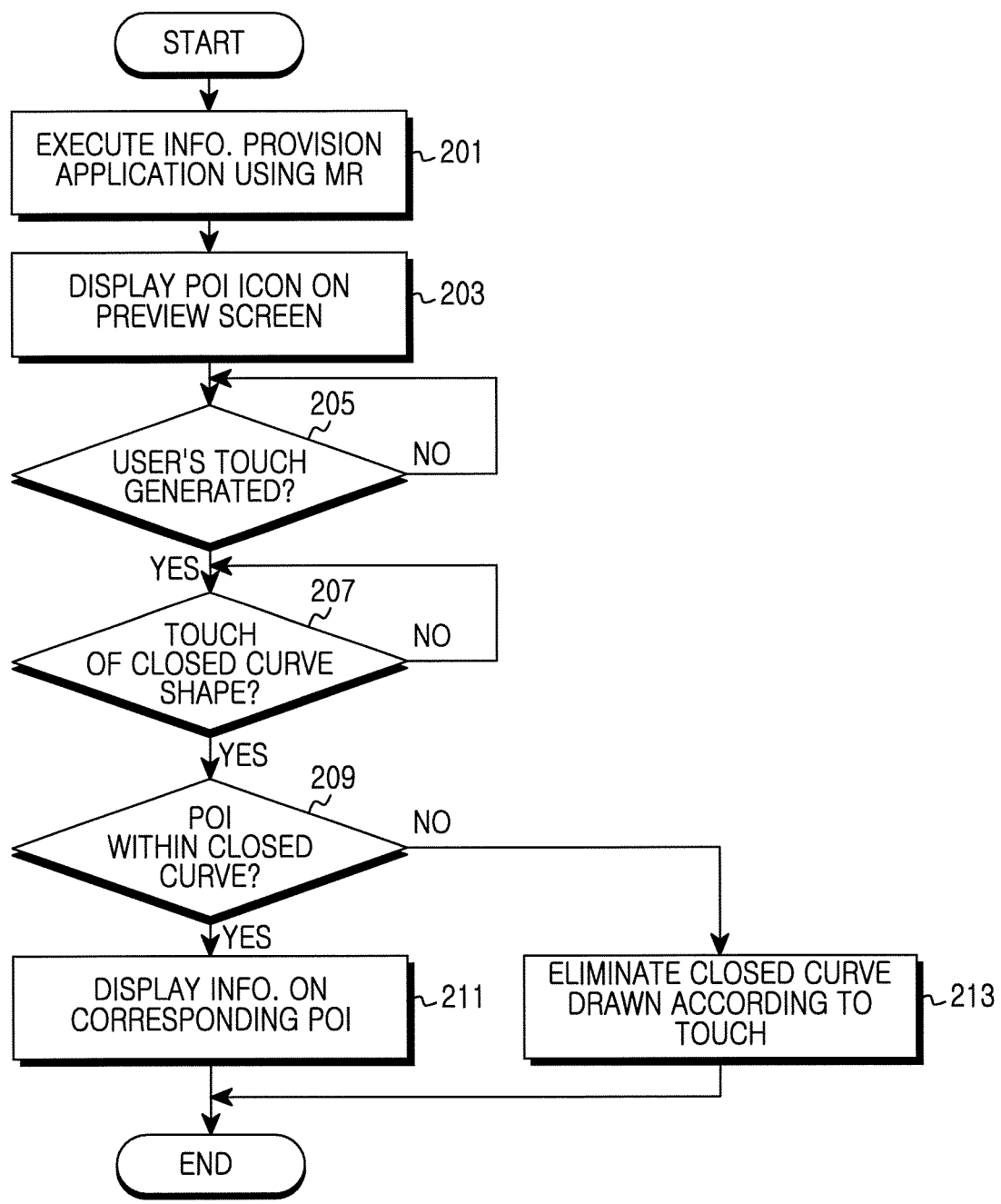
FIG. 2 illustrates a process for displaying information on a Point Of Interest (POI) included within a closed curve drawn according to a user's touch in a portable terminal according to an embodiment of the present invention.

FIG. 2 illustrates a process for displaying information on a POI included within a closed curve drawn according to a user's touch in a portable terminal according to an embodiment of the present invention.

Figure 3A:
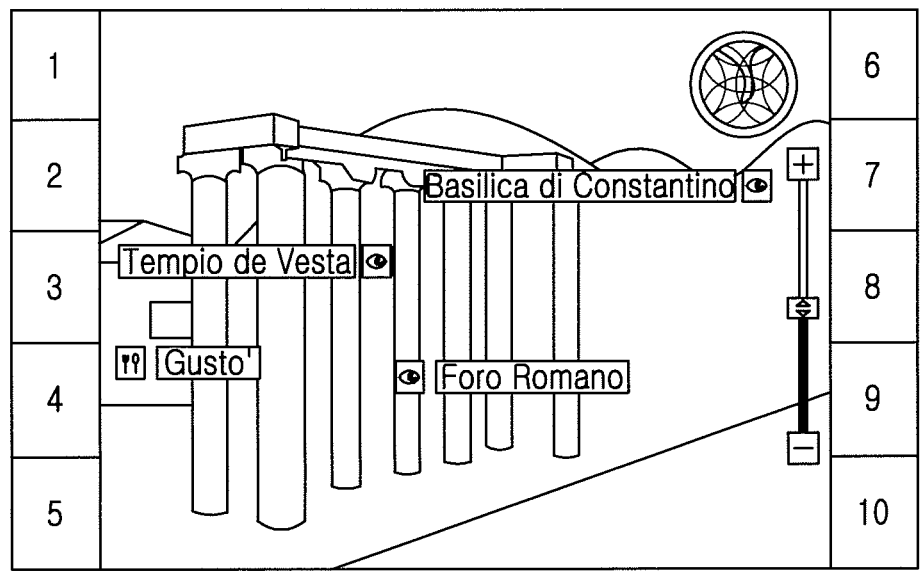
FIGS. 3A to 3C illustrates a screen configuration of displaying information on a POI included within a closed curve drawn according to a user's touch in a portable terminal according to an embodiment of the present invention.

Referring to FIG. 2, if an information provision application using MR is executed in block 201, the portable terminal proceeds to block 203 and displays an image input from a camera on a screen, displaying a POI icon on a preview screen displaying the image thereon. That is, the portable terminal acquires POI information corresponding to the image displayed on the screen and, as illustrated in FIG. 3A, displays POI icons for showing that POI information exists in the image. At this time, the icon is displayed in near the image corresponding to a corresponding POI.

Figure 3B:
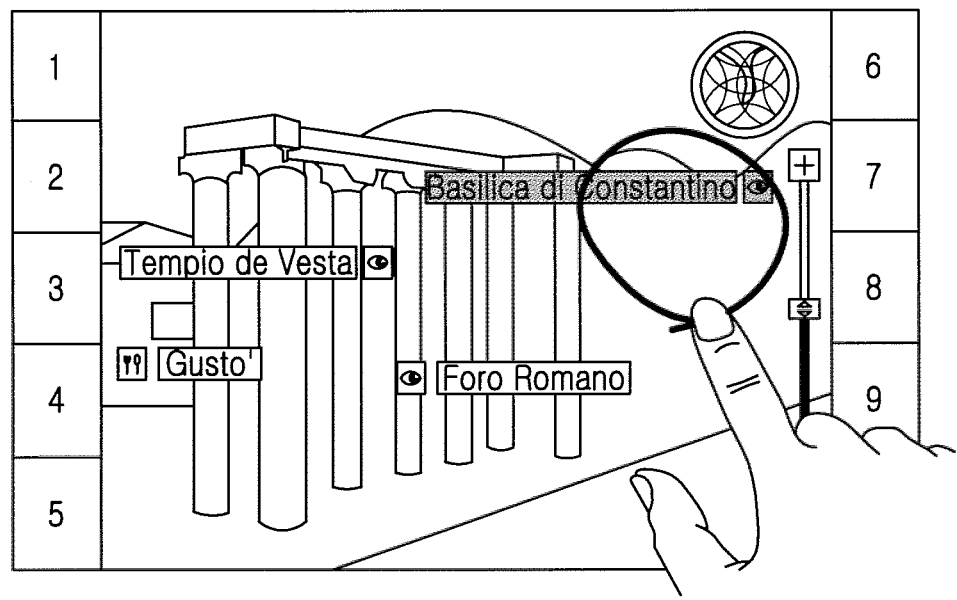

In block 205, the portable terminal senses if a user's touch is generated. If the user's touch is generated, the portable terminal proceeds to block 207 and determines if the touch is a touch of a closed curve shape. That is, the portable terminal recognizes a coordinate of the user's initial contact and, as illustrated in FIG. 3B, determines if the touch forms the closed curve shape. The portable terminal may indicate to a user the position in which the screen is touched by displaying, using dots or lines, coordinates in which the screen is touched.

If the user's touch forms a closed curve shape, in block 209, the portable terminal determines if a POI exists within the closed curve of the displayed image. Here, the portable terminal may determine if an icon is displayed in the area within the closed curve of the displayed image, or may determine if the POI corresponding to the area exists within the closed curve of the displayed image through a search of a POI DB.

Figure 3C:
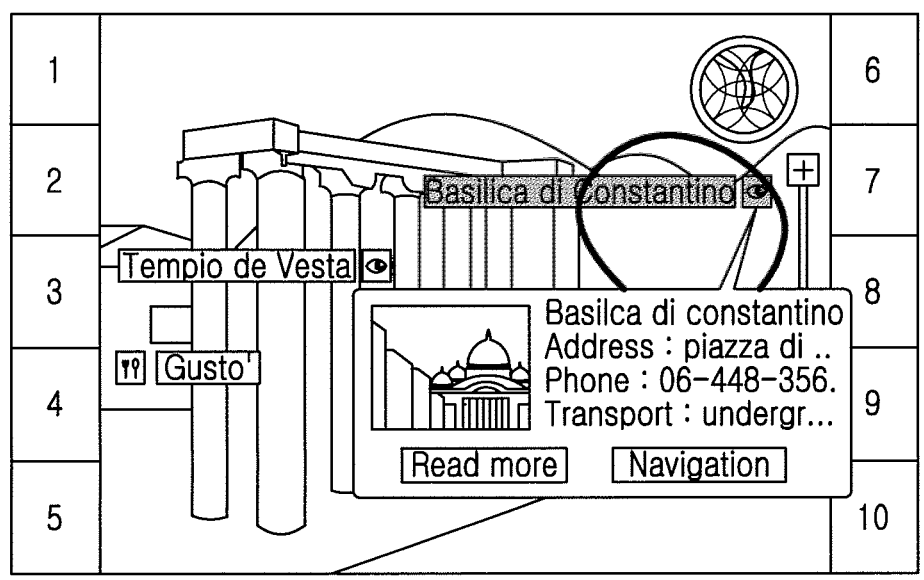
Figure 4A:
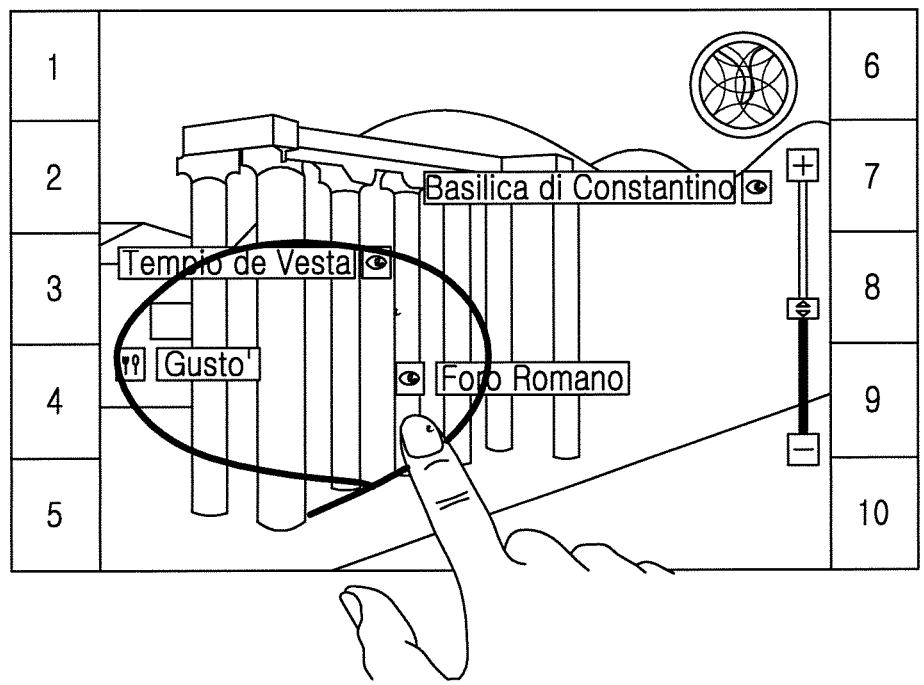
FIGS. 4A and 4B illustrates a screen configuration of displaying information on a plurality of POIs included within a closed curve drawn according to a user's touch in a portable terminal according to an embodiment of the present invention.
Figure 4B:
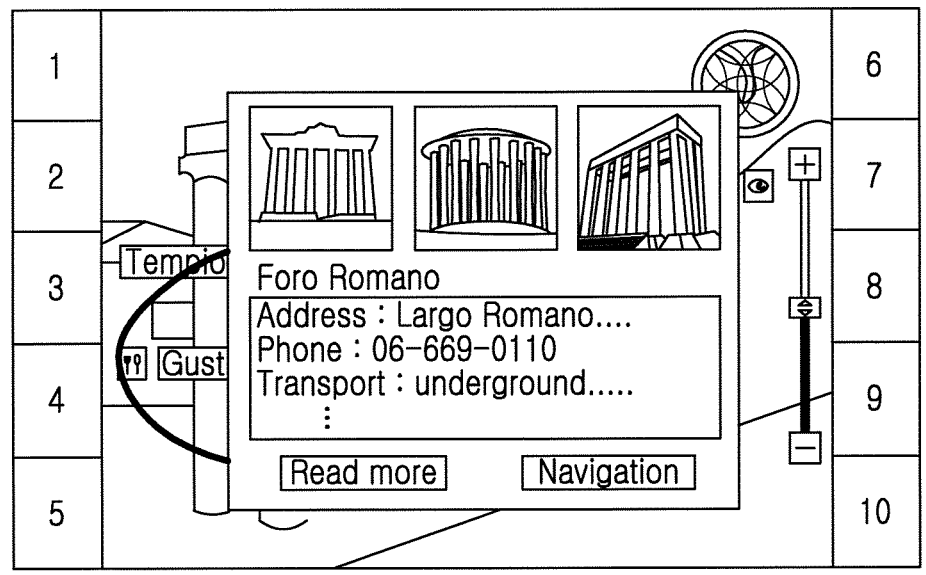

If the POI corresponding to the area exists within the closed curve of the displayed image, in block 211, the portable terminal searches information on the POI in the POI DB, and displays the searched POI information on the screen. For example, when a touch is performed in a closed curve shape and one POI exists within a closed curve as illustrated in FIG. 3B, the portable terminal displays information on the one POI on the screen as illustrated in FIG. 3C. Also, when a touch is performed in a closed curve shape and a plurality of POIs exist within a closed curve as illustrated in FIG. 4A, the portable terminal displays information on the plurality of POIs on the screen as illustrated in FIG. 4B.

In contrast, when no POI corresponding to the area exists within the closed curve of the displayed image, in block 213, the portable terminal eliminates the closed curve displayed on the screen and terminates the procedure according to the embodiment of the present invention.

Figure 5:
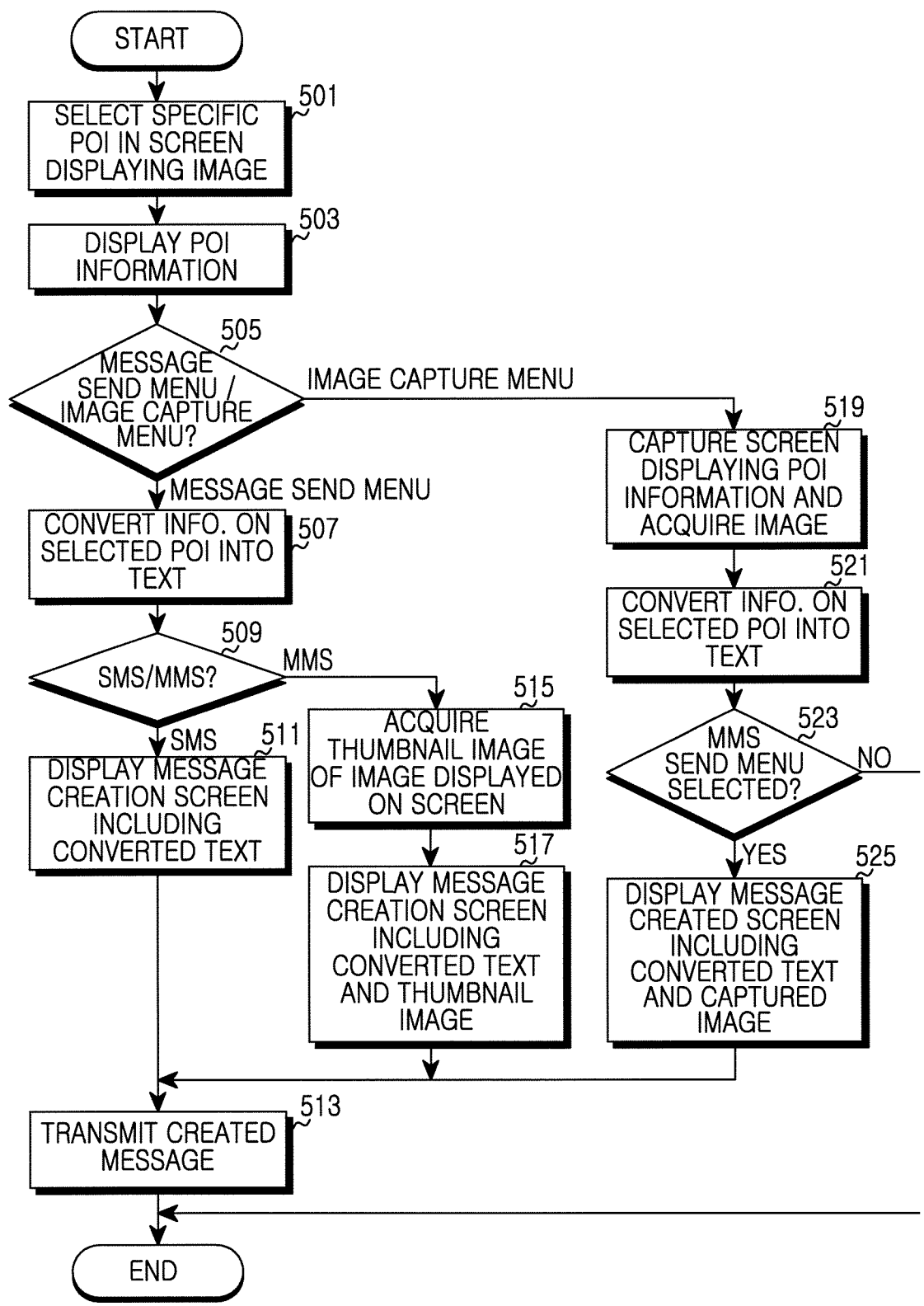
FIG. 5 illustrates a process for transmitting information on a selected POI to other Mobile Station (MS) in a portable terminal according to an embodiment of the present invention.

FIG. 5 illustrates a process for transmitting information on a selected POI to other MS in a portable terminal according to an embodiment of the present invention.

Referring to FIG. 5, if a specific POI is selected by a user in a screen displaying an image with the POI in block 501, the portable terminal proceeds to block 503 and displays information related to the selected POI on the screen.

In block 505, the portable terminal determines if a message send menu is selected or an image capture menu is selected.

If the message send menu is selected, the portable terminal proceeds to block 507 and searches information on the selected POI in a POI DB 132, and converts the searched POI information into a text. In block 509, the portable terminal determines whether the message send menu is for transmitting an SMS or MMS.

Figure 6A:
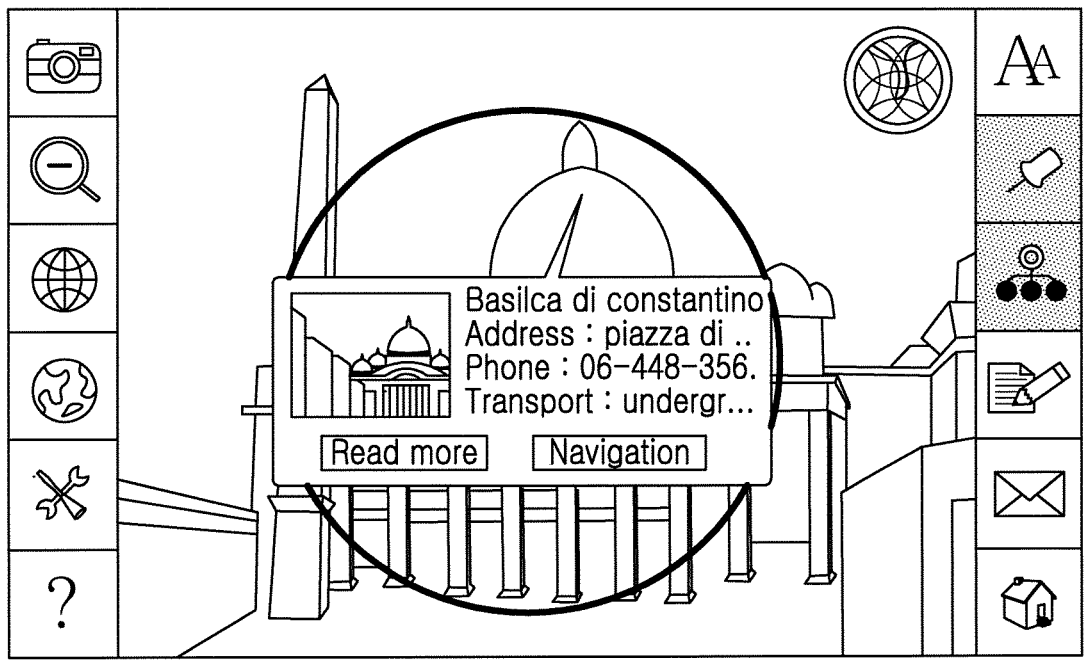
FIGS. 6A to 6D illustrate a screen configuration of transmitting information on a selected POI to other MS in a portable terminal according to an embodiment of the present invention.
Figure 6B:
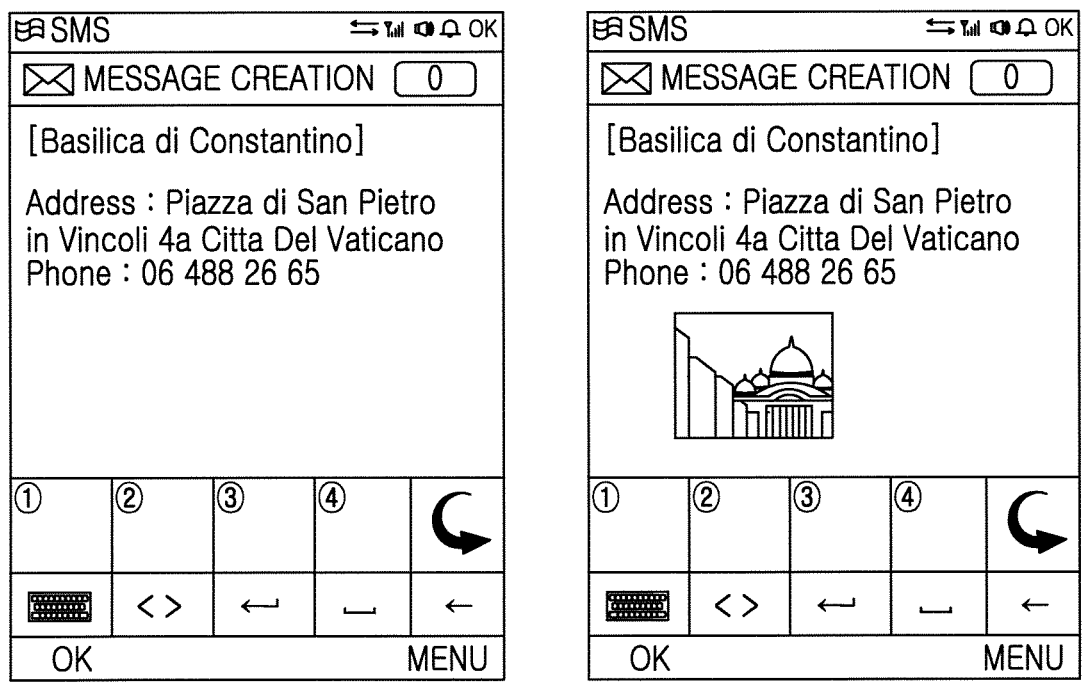
Figure 6C:
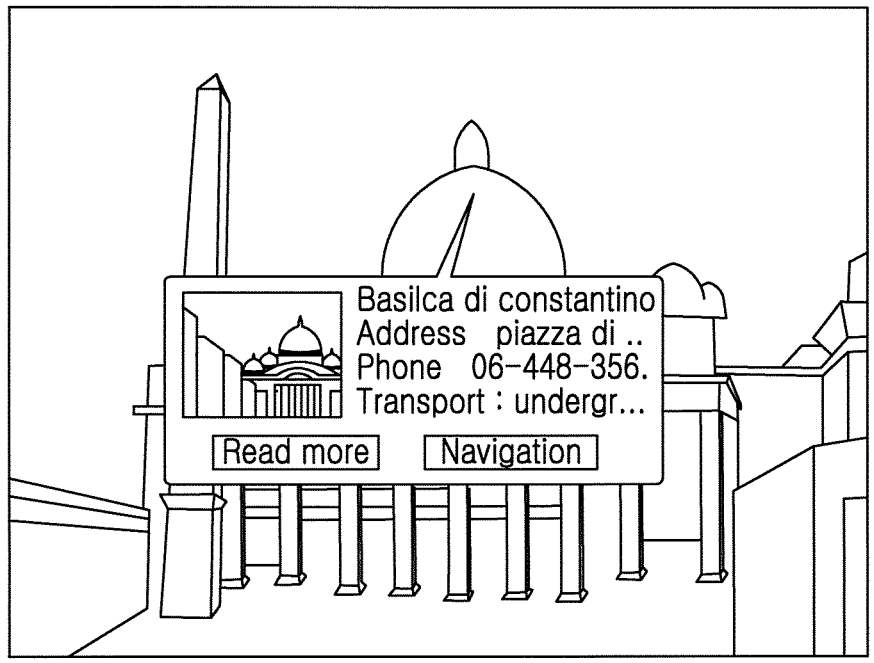

If the message send menu is for transmitting SMS, in block 511, the portable terminal displays a message creation screen that includes a converted text and proceeds to block 513. For example, in a state in which POI information on a specific building is displayed as illustrated in FIG. 6A, if an SMS message creation menu is selected, the portable terminal displays a message creation screen that includes the POI information on the specific building as illustrated in FIG. 6B.

Alternatively, if the message send menu is for transmitting MMS, in block 515, the portable terminal acquires a thumbnail image of the image displayed on the screen. The portable terminal then proceeds to block 517 and displays a message creation screen that includes the converted text and the thumbnail image, and proceeds to block 513. For example, in a state in which the POI information on the specific building is displayed as illustrated in FIG. 6A, if an MMS message creation menu is selected, the portable terminal displays a message creation screen that includes the POI information on the specific building and the thumbnail image for the specific building as illustrated in FIG. 6B.

If the image capture menu is selected in block 505, the portable terminal proceeds to block 519 and captures the screen displaying the POI information to acquire an image. The portable terminal then proceeds to block 521 and searches information on the selected POI in the POI DB 132, and converts the searched POI information into text.

Figure 6D:
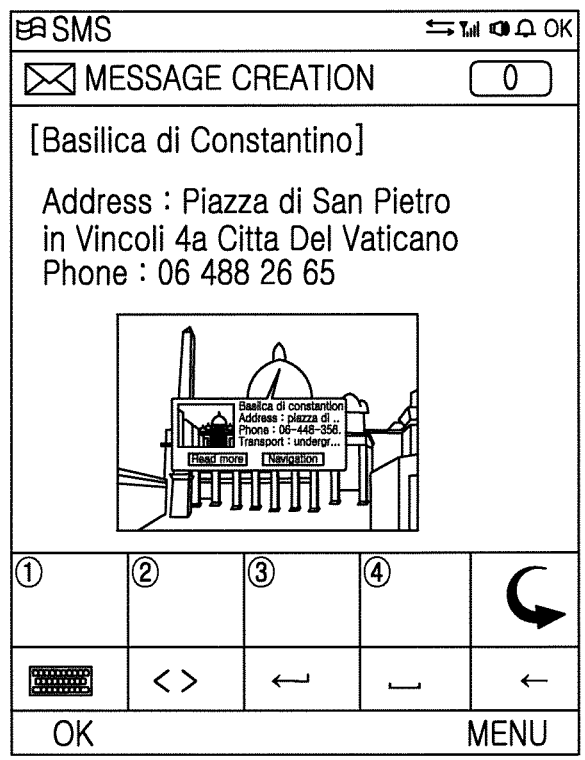

In block 523, the portable terminal determines if an MMS message send menu is selected. If the MMS message send menu is selected in block 523, the portable terminal proceeds to block 525 and displays a message creation screen that includes the converted text and the captured image, and proceeds to block 513. For example, when the POI information on the specific building is displayed as illustrated in FIG. 6A, if an image capture menu is selected, the portable terminal captures the screen of the portable terminal and acquires an image illustrated in FIG. 6C, and displays a message creation screen including the POI information on the specific building and the captured image as illustrated in FIG. 6D.

If the MMS message send menu is not selected in block 523, the portable terminal terminates the procedure according to the embodiment of the present invention.

Next, in block 513, the portable terminal sends a message composed by a user to an MS, and terminates the procedure according to the embodiment of the present invention.

Figure 7:
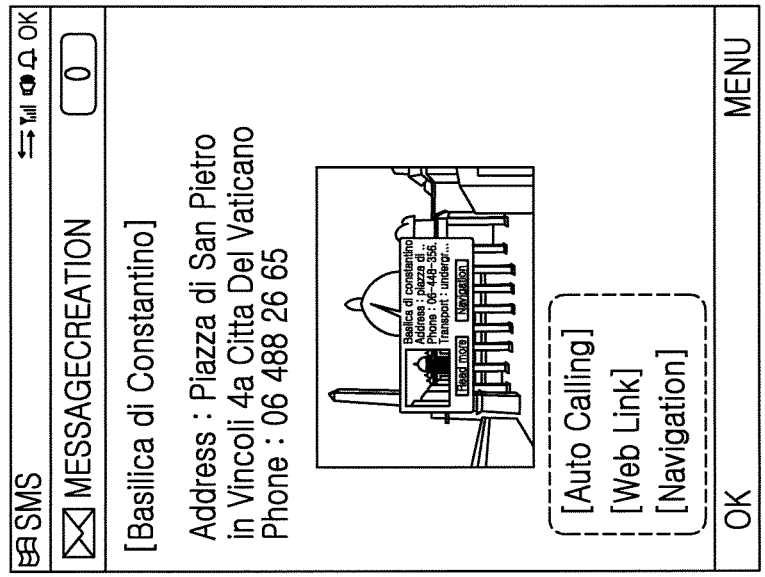
FIG. 7 illustrates a link function for a received message including POI information in a portable terminal according to an embodiment of the present invention.
Figure 7:
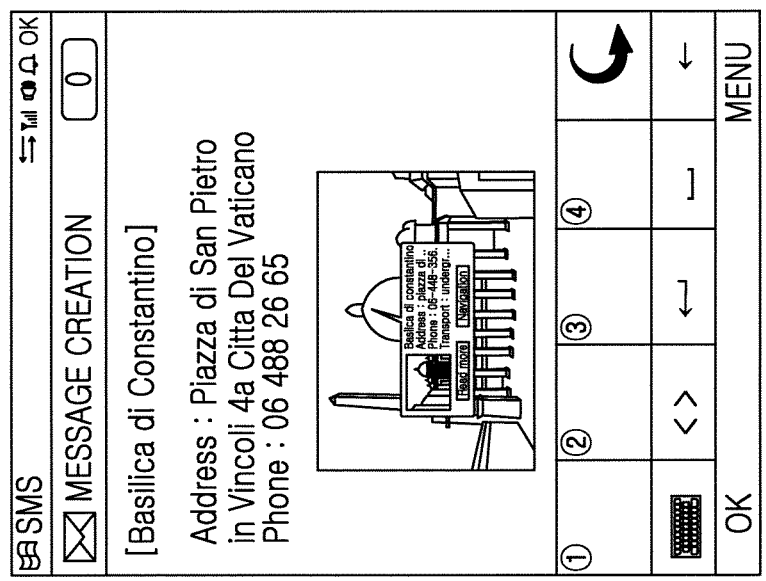

By transmitting POI information to an MS through a message a receiving MS that is not equipped with an information provision application using MR may still share the POI information. Also, the MS that receives the message including the POI information is able to determine that a POI is included within the message through a controller, and provide a link function such as 'Auto Calling', 'Web Link', and 'Navigation' on the basis of the POI information as illustrated in FIG. 7.

Figure 8:
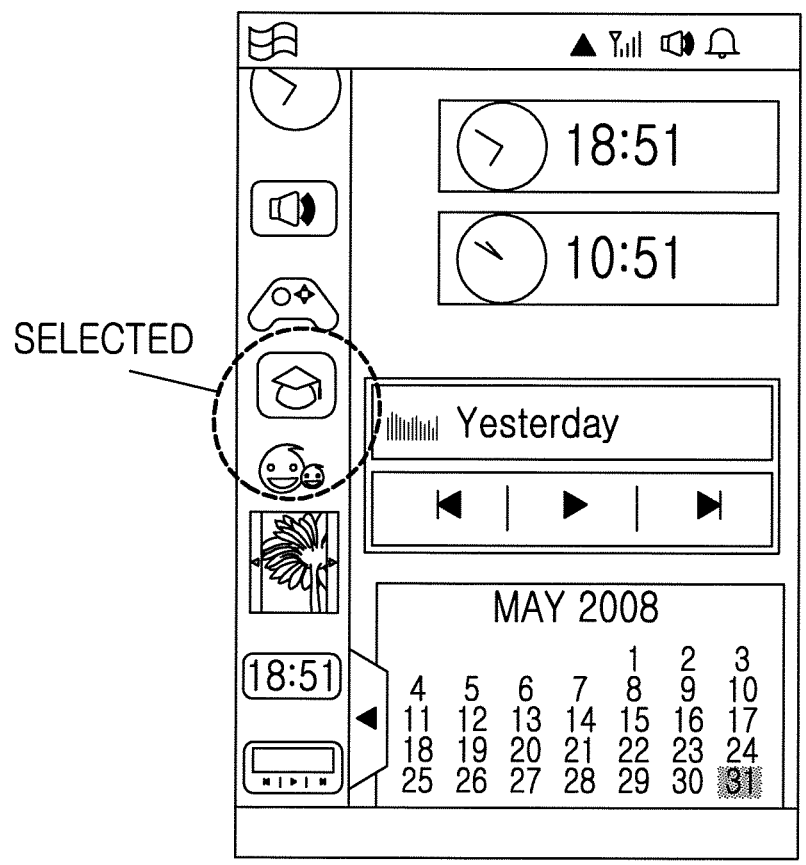
FIG. 8 illustrates a screen configuration of performing multi selection using a closed curve in a portable terminal according to an embodiment of the present invention.

Additionally, when a user's touch is generated in a closed curve shape as discussed, the present invention performs a function such as selecting a POI icon that exists within a closed curve, but may also perform a function of selecting a different icon using the closed curve. For example, as illustrated in FIG. 8, when a plurality of menu icons exist within a closed curve drawn according to a user's touch, the present invention may simultaneously select the plurality of menu icons.

By displaying information on a POI included within a closed curve drawn according to a user's touch, the present invention has the capability to allow a user to intuitively select a focus for POI display and easily acquire POI information in a portable terminal that supports MR technology. By transmitting information on a selected POI to an MS through a message, the present invention is able to share the POI information even with an MS that does not support MR technology. Also, by using a closed curve drawn according to a user's touch, the present invention has an effect of making multi selection possible.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing information in an electronic device, the method comprising:
displaying a plurality of icons around a plurality of objects that is included in a first image obtained through a camera of the electronic device;
in response to receiving an input to select an area on the first image, displaying, on the first image, a visual indicator associated with the area on the first image, wherein the visual indicator is configured by a user;
determining whether one or more icons of the plurality of icons are within the area;
in response to determining that none of the plurality of icons is within the visual indicator configured by the user, terminating providing the information associated with the plurality of objects by eliminating the displayed visual indicator configured by the user;
in response to determining that one or more icons of the plurality of icons are within the area, displaying information associated with one or more objects corresponding to the one or more icons on the first image, around one or more objects of the plurality of objects corresponding to the one or more icons, within the area; and
storing the first image obtained through the camera along with the displayed information, as a second image.

2. The method of claim 1, wherein the plurality of icons around the plurality of objects includes a plurality of icons indicating a plurality of points of interest (POI), and wherein the plurality of icons is displayed in a position of the area of the first image mapped to at least one of the plurality of POIs.

3. The method of claim 1, further comprising:
in response to selecting a short message service (SMS) send menu, converting the displayed information into a text;
displaying an SMS creation screen comprising the text that is converted from the displayed information; and
transmitting an SMS to a mobile station (MS).

4. The method of claim 1, further comprising:
in response to selecting a multimedia message service (MMS) send menu, converting the displayed information into a text;
acquiring a thumbnail image of the first image;
displaying an MMS creation screen comprising the text that is converted from the displayed information and the thumbnail image; and
transmitting an MMS to an MS.

5. The method of claim 1, further comprising:
in response to determining that none of the plurality of icons is within the area, determining whether at least one menu icon exists within the area; and
in response to determining that the at least one menu icon exists within the area, selecting the at least one menu icon.

6. The method of claim 1, further comprising:
storing the information on a POI in a database; and
acquiring the information on the POI from the database.

7. The method of claim 1, further comprising acquiring the information on a POI from an external source.

8. An electronic device for providing information, the electronic device comprising:
a camera;
a display configured to display a plurality of icons around a plurality of objects that is included in a first image obtained through the camera; and
a controller operably connected to the camera and the display, the controller configured to:
in response to receiving an input to select an area on the first image, display, on the first image, a visual indicator associated with the area on the first image, wherein the visual indicator is configured by a user;
determine whether one or more icons of the plurality of icons are within the area;
in response to determining that none of the plurality of icons is within the visual indicator configured by the user, terminating providing the information associated with the plurality of objects by eliminating the displayed visual indicator configured by the user;
in response to determining that one or more icons of the plurality of icons are within the area, display information associated with one or more objects corresponding to the one or more icons on the first image, around one or more objects of the plurality of objects corresponding to the one or more icons, within the area; and
store the first image obtained through the camera along with the displayed information, as a second image.

9. The electronic device of claim 8, wherein the plurality of icons around the plurality of objects includes a plurality of icons indicating a plurality of points of interest (POI), and wherein the plurality of icons is displayed in a position of the area of the first image mapped to at least one of the plurality of POIs.

10. The electronic device of claim 8, further comprises a communication interface operably connected to the controller, and wherein, in response to selecting a short message service (SMS) send menu, the controller is further configured to:
convert the displayed information into a text;
display an SMS creation screen comprising the text that is converted from the displayed information; and
transmit an SMS to a mobile station (MS) through the communication interface.

11. The electronic device of claim 8, further comprises a communication interface operably connected to the controller, and wherein, in response to selecting a multimedia message service (MMS) send menu, the controller is further configured to:
   convert the displayed information into a text;
   acquire a thumbnail image of the first image;
   display an MMS creation screen comprising the text that is converted from the displayed information and the thumbnail image; and
   transmit an MMS to an MS through the communication interface.

12. The electronic device of claim 8, wherein, in response to determining that none of the plurality of icons is within the area, the controller is further configured to:
   determine whether at least one menu icon exists within the area; and
   in response to determining that the at least one menu icon exists within the area, select the at least one menu icon.

13. The electronic device of claim 8, wherein the controller is configured to:
   store the information on a POI in a database; and
   acquire the information on the POI from the database.

14. The electronic device of claim 8, wherein the controller is configured to acquire the information on a POI from an external source.

15. A non-transitory computer-readable medium comprising program code, that when executed by at least one processor of an electronic device for providing information, causes the electronic device to:
   display a plurality of icons around a plurality of objects that is included in a first image obtained through a camera
   in response to receiving an input to select an area on the first image, display, on the first image, a visual indicator associated with the area on the first image, wherein the visual indicator is configured by a user;
   determine whether one or more icons of the plurality of icons are within the area;
   in response to determining that none of the plurality of icons is within the visual indicator configured by the user, terminating providing the information associated with the plurality of objects by eliminating the displayed visual indicator configured by the user;
   in response to determining that one or more icons of the plurality of icons are within the area, display information associated with one or more objects corresponding to the one or more icons on the first image, around one or more objects of the plurality of objects corresponding to the one or more icons, within the area; and
   store the first image obtained through the camera along with the displayed information, as a second image.

16. The non-transitory computer-readable medium of claim 15, wherein the plurality of icons around the plurality of objects includes a plurality of icons indicating a plurality of points of interest (POI), and wherein the plurality of icons is displayed in a position of the area of the first image mapped to at least one of the plurality of POIs.

17. The non-transitory computer-readable medium of claim 15, further comprising program code, that when executed by at least one processor of an electronic device, causes the electronic device to, in response to selecting a short message service (SMS) send menu:
   convert the displayed information into a text;
   display an SMS creation screen comprising the text that is converted from the displayed information; and
   transmit an SMS to a mobile station (MS) through a communication interface.

18. The non-transitory computer-readable medium of claim 15, wherein, in response to selecting a multimedia message service (MMS) send menu, further comprising program code, that when executed by at least one processor of an electronic device, causes the electronic device to:
   convert the displayed information into a text;
   acquire a thumbnail image of the first image;
   display an MMS creation screen comprising the text that is converted from the displayed information and the thumbnail image; and
   transmit an MMS to an MS through a communication interface.

19. The non-transitory computer-readable medium of claim 15, wherein, in response to determining that none of the plurality of icons is within the area, further comprising program code, that when executed by at least one processor of an electronic device, causes the electronic device to:
   determine whether at least one menu icon exists within the area; and
   in response to determining that the at least one menu icon exists within the area, select the at least one menu icon.

20. The non-transitory computer-readable medium of claim 15, further comprising program code, that when executed by at least one processor of an electronic device, causes the electronic device to:
   store the information on a POI in a database; and
   acquire the information on the POI from the database.

* * * * *